US008627139B2

(12) United States Patent
Fan

(10) Patent No.: US 8,627,139 B2
(45) Date of Patent: Jan. 7, 2014

(54) METHOD, RECORDING TERMINAL, SERVER, AND SYSTEM FOR REPAIRING MEDIA FILE RECORDING ERRORS

(75) Inventor: Yunsong Fan, Chengdu (CN)

(73) Assignee: Huawei Device Co., Ltd., Shenzhen (CN)

( * ) Notice: Subject to any disclaimer, the term of this patent is extended or adjusted under 35 U.S.C. 154(b) by 199 days.

(21) Appl. No.: 13/112,729

(22) Filed: May 20, 2011

(65) Prior Publication Data

US 2011/0225454 A1 Sep. 15, 2011

Related U.S. Application Data

(63) Continuation of application No. PCT/CN2009/074368, filed on Oct. 9, 2009.

(30) Foreign Application Priority Data

Nov. 21, 2008 (CN) .......................... 2008 1 0226739

(51) Int. Cl.
*G06F 11/00* (2006.01)
(52) U.S. Cl.
USPC ............................. 714/6.1; 714/43; 714/746
(58) Field of Classification Search
USPC ......................................................... 714/6.1
See application file for complete search history.

(56) References Cited

U.S. PATENT DOCUMENTS

| | | | |
|---|---|---|---|
| 6,640,145 B2 * | 10/2003 | Hoffberg et al. ................. 700/83 |
| 7,065,212 B1 * | 6/2006 | Yu et al. ....................... 380/205 |
| 7,742,429 B1 * | 6/2010 | Huang et al. .................. 370/254 |
| 7,826,527 B2 * | 11/2010 | Wang ............................. 375/240 |
| 8,279,726 B2 * | 10/2012 | Utsumi et al. ............. 369/47.12 |
| 2002/0152440 A1 * | 10/2002 | Yona et al. ..................... 714/746 |
| 2002/0165791 A1 * | 11/2002 | Segawa et al. .................. 705/26 |
| 2003/0236905 A1 * | 12/2003 | Choi et al. ..................... 709/231 |
| 2004/0073916 A1 * | 4/2004 | Petrovic et al. ................. 725/18 |
| 2005/0160308 A1 | 7/2005 | Elcock et al. |
| 2005/0182842 A1 | 8/2005 | Walsh et al. |

(Continued)

FOREIGN PATENT DOCUMENTS

| | | |
|---|---|---|
| CN | 1969528 A | 5/2007 |
| CN | 101202908 A | 6/2008 |

(Continued)

OTHER PUBLICATIONS

Office Action issued in corresponding Chinese Patent Application No. 200810226739.9, mailed Aug. 11, 2010.

(Continued)

*Primary Examiner* — Kamini Patel
(74) *Attorney, Agent, or Firm* — Brinks Gilson & Lione

(57) ABSTRACT

A method, a recording terminal, a server, and a system for repairing media file recording errors are disclosed in embodiments of the present invention. The method includes: generating description information about a recording error when a recording terminal identifies the recording error in live recording of a media file; sending a recording error repair request that carries the description information to a network device; and repairing the media file recorded by the recording terminal according to repair information when receiving the repair information sent by the network device according to the description information. With the present invention, the recording errors are repaired through a bidirectional network between the recording terminal and the network device, and reliability of repairing the recording errors is ensured.

21 Claims, 9 Drawing Sheets

(56) References Cited

U.S. PATENT DOCUMENTS

| | | | |
|---|---|---|---|
| 2005/0249231 A1* | 11/2005 | Khan | 370/428 |
| 2006/0023652 A1 | 2/2006 | Vedantham et al. | |
| 2006/0026295 A1* | 2/2006 | Iwamura | 709/233 |
| 2006/0179154 A1* | 8/2006 | Sitaraman et al. | 709/231 |
| 2006/0285501 A1* | 12/2006 | Damm | 370/252 |
| 2008/0052404 A1* | 2/2008 | Leighton et al. | 709/231 |
| 2008/0141309 A1 | 6/2008 | Barsness | |
| 2009/0144596 A1* | 6/2009 | Mohan | 714/746 |
| 2009/0144769 A1 | 6/2009 | Liebhold et al. | |
| 2009/0158096 A1* | 6/2009 | Ali et al. | 714/43 |
| 2009/0257512 A1* | 10/2009 | Demas et al. | 375/240.27 |
| 2010/0046634 A1* | 2/2010 | Dai et al. | 375/240.25 |
| 2010/0050225 A1* | 2/2010 | Bennett | 725/144 |
| 2010/0100528 A1* | 4/2010 | Brockway et al. | 707/610 |
| 2010/0125768 A1* | 5/2010 | Mauchly et al. | 714/749 |
| 2010/0128595 A1* | 5/2010 | Karaoguz et al. | 370/216 |
| 2010/0228857 A1* | 9/2010 | Petrovic et al. | 709/224 |
| 2011/0083037 A1* | 4/2011 | Bocharov et al. | 714/4.11 |
| 2011/0219258 A1* | 9/2011 | Cooper et al. | 714/2 |
| 2011/0246621 A1* | 10/2011 | May et al. | 709/219 |
| 2011/0268175 A1* | 11/2011 | Tan et al. | 375/240.01 |
| 2012/0023239 A1* | 1/2012 | Fan et al. | 709/227 |
| 2012/0026393 A1* | 2/2012 | Petrovic et al. | 348/462 |
| 2012/0060052 A1* | 3/2012 | White et al. | 714/6.3 |
| 2012/0060053 A1* | 3/2012 | White et al. | 714/6.3 |

FOREIGN PATENT DOCUMENTS

| | | |
|---|---|---|
| CN | 101212618 A | 7/2008 |
| CN | 101267524 A | 9/2008 |
| CN | 101300834 A | 11/2008 |
| CN | 101420317 A | 4/2009 |
| CN | 101420317 B | 10/2011 |
| JP | 2006352264 A | 12/2006 |
| WO | WO 2008/012488 A2 | 1/2008 |

OTHER PUBLICATIONS

Extended European Search Report issued in corresponding European Patent Application No. 09827149.7, mailed Jul. 20, 2011.

Written Opinion of the International Searching Authority issued in corresponding PCT Patent Application No. PCT/CN2009/074368, mailed Jan. 21, 2010.

International Search Report issued in corresponding PCT Patent Application No. PCT/CN2009/074368, mailed Jan. 21, 2010.

* cited by examiner

METHOD, RECORDING TERMINAL, SERVER, AND SYSTEM FOR REPAIRING MEDIA FILE RECORDING ERRORS

CROSS-REFERENCE TO RELATED APPLICATIONS

This application is a continuation of International Application No. PCT/CN2009/074368, filed on Oct. 9, 2009, which claims priority to Chinese Patent Application No. 200810226739.9, filed on Nov. 21, 2008, both of which are hereby incorporated by reference in their entireties.

FIELD OF THE INVENTION

The present invention relates to a network communication technology, and in particular, to a method, a recording terminal, a server, and a system for repairing media file recording errors.

BACKGROUND OF THE INVENTION

In the research and standardization process of Internet Protocol Television (IPTV), the video recording service in the IPTV draws a lot of attention. When live television signals are transmitted through a cable network, a terrestrial transmission network, a satellite live network, or an IP network, the video recording service stores the live television content on a local storage device connected to the terminal or on a network storage space for future use. Video recording implements core functions such as receiving, descrambling, re-encrypting, and storing compressed code streams. Many mitigation measures may be taken to reduce recording errors. Such measures include: enhancing the network transmission quality, identifying and correcting transmission errors based on a specific algorithm, using a reliable transmission protocol to ensure transmission quality, improving stability of a recording terminal (primarily ensuring stability of the storing unit) or correcting errors through automatic frame skipping in the playing process. Although the recording errors of live videos may be reduced through the mitigation measures, the transmission link is not absolutely reliable, and therefore recording errors are not completely evitable.

When a live video recording error occurs, the live video with the recording error needs to be repaired. A prior art that repairs recording errors include: When a live video recording error occurs, searching an Electronic Program Guide (EPG) to check whether the same program exists in the subsequent time segments, and, if the same program exists in the subsequent time segments, triggering a new recording task automatically.

In the process of implementing the present invention, the inventor finds that in the prior art which repairs an program with a recording error by recording the same program in a subsequent time segment, the repair depends on existence of the same program in different time segments, and that the reliability of repairing the recording error is low.

SUMMARY OF THE INVENTION

The embodiments of the present invention provide a method, a recording terminal, a server, and a system for repairing media file recording errors so as to improve reliability of repairing recording errors and reduce line bandwidth consumed by the repair.

A method for repairing media file recording errors provided in an embodiment of the present invention includes:

generating description information about a recording error when a recording terminal identifies the recording error in live recording of a media file;

sending a recording error repair request that carries the description information to a network device; and repairing the media file recorded by the recording terminal according to repair information when receiving the repair information sent by the network device according to the description information.

In the method provided in the foregoing embodiment, when the recording terminal records the media file erroneously, the recording terminal sends a recording error repair request that carries description information about the recording error to the network device through a bidirectional network between the recording terminal and the network device, and repairs the recorded media file according to the repair information sent by the network device, ensuring reliability of repairing the media file recording error.

A recording terminal provided in an embodiment of the present invention includes a recording module and further includes:

a generating module, configured to generate description information about a recording error when identifying the recording error in live recording of a media file;

a repair requesting module, configured to send a recording error repair request that carries the description information to a network device; and a repairing module, configured to repair the media file recorded by the recording terminal according to repair information when receiving the repair information sent by the network device according to the description information.

In the embodiment above, when the recording terminal identifies a recording error in the live recording of a media file, the repair requesting module sends a recording error repair request that carries description information about the recording error to the network device through a bidirectional network between the recording terminal and the network device, and the repairing module repairs the recorded media file according to the repair information sent by the network device, ensuring reliability of repairing the media file recording error.

A network server provided in an embodiment of the present invention includes:

a network recording module, configured to record a media file live;

a storing module, configured to store data recorded by the recording module; and a recording managing module, configured to: receive a recording error repair request that carries description information about a recording error identified by a recording terminal in live recording of the media file; and obtain recording data that matches the description information from the storing module, and send the recording data to the recording terminal.

In the embodiment above, the network server receives a recording error repair request from a recording terminal through a bidirectional network between the recording terminal and the network server, and sends recording data that matches the request to the recording terminal. In this way, the recording terminal can repair the recorded media file, and the reliability of repairing the media file recording error is ensured.

Another network server provided in an embodiment of the present invention includes:

a repair request receiving module, configured to receive a recording error repair request that carries description information about a recording error identified by a recording terminal in live recording of a media file;

a broadcasting module, configured to broadcast a query request that carries the description information; and a repair request responding module, configured to send information about another recording terminal to the recording terminal when receiving a query response sent by the another recording terminal which stores recording data that matches the description information to a second network server.

In the embodiment above, the network server receives a recording error repair request from a recording terminal through a bidirectional network between the recording terminal and the network server, and sends information about another recording terminal to the recording terminal, where the another recording terminal stores the recording data that matches the request. In this way, the recording terminal that sends the recording error repair request can obtain correct recording data from the another recording terminal to repair the recorded media file, ensuring reliability of repairing the media file recording error.

A system for repairing media file recording errors in an embodiment of the present invention includes a live system head-end, a network device, and a recording terminal.

The recording terminal is configured to: generate description information about a recording error when identifying the recording error in live recording of a media file of the live system head-end; send a recording error repair request that carries the description information to the network device; and repair the media file recorded by the recording terminal according to repair information when receiving the repair information sent by the network device according to the description information.

The network device is configured to send the repair information that matches the description information to the recording terminal when receiving the recording error repair request.

In the system provided in the foregoing embodiment, when the recording terminal records the media file of the live system head-end erroneously, the system sends a recording error repair request that carries description information about the recording error to the network device through a bidirectional network between the recording terminal and the network device, and repairs the recorded media file according to the repair information sent by the network device, ensuring reliability of repairing the media file recording error.

BRIEF DESCRIPTION OF THE DRAWINGS

To describe the technical solution under the present invention more clearly, the following briefly describes the accompanying drawings involved in the embodiments of the present invention. Apparently, the accompanying drawings below are not exhaustive, and persons of ordinary skill in the art can derive other drawings from such accompanying drawings without any creative effort.

DETAILED DESCRIPTION OF THE EMBODIMENTS

The technical solution under the present invention is described below with reference to accompanying drawings and exemplary embodiments.

In the following detailed embodiments, "live recording" means that a recording terminal or a network device records a media file played by a live system head-end through a live network; and "recording error" means that data recorded by the recording terminal is different from the original data of the live system head-end due to faults of network transmission, faults of the recording terminal, or other faults.

Figure 1:
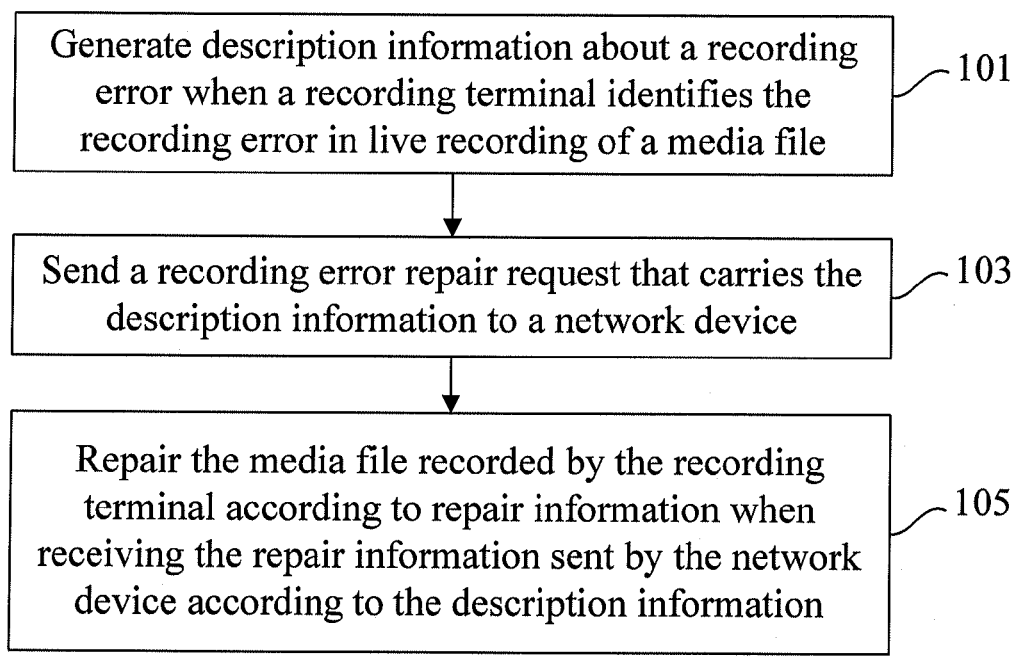
FIG. 1 is a flow chart of a method for repairing media file recording errors according to a first embodiment of the present invention.

FIG. 1 is a flow chart of a method for repairing media file recording errors according to a first embodiment of the present invention. As shown in FIG. 1, the method in this embodiment includes the following steps:

Step 101: Generate description information about a recording error when the recording terminal identifies the recording error in live recording of a media file.

Step 103: Send a recording error repair request that carries the description information to the network device, where the description information is generated in step 101 mentioned above.

Step 105: Repair the media file recorded by the recording terminal according to repair information when receiving the repair information sent by the network device according to the description information.

In the embodiment above, when the recording terminal records the media file erroneously, the recording terminal sends a recording error repair request that carries description information about the recording error to the network device through a bidirectional network between the recording terminal and the network device, and repairs the recorded media file according to the repair information sent by the network device, ensuring reliability of repairing the media file recording error.

In the process of implementing the present invention, the inventor finds that many methods for mitigating recording errors are available, as exemplified below:

Enhancing network transmission quality: The essence of this method is to enhance the quality of physical links. Major factors related to the quality of the physical links include transmission loss, transmission interference, and multi-path effect, which are generally overcome by link negotiation and line shielding. However, the satellite and terrestrial live television transmission networks are vulnerable to external interference because the transmission medium is air, and the transmission of such networks is never errorless. Even worse, interference from strong signals may deteriorate the signal quality drastically.

Correcting network transmission errors: Link transmission errors are identified and corrected according to redundant information such as linear packet codes, cyclical codes, and convolutional codes. However, the use of the redundant information is unable to eliminate network transmission errors thoroughly. In satellite and terrestrial transmission, data fragments may not be normally receivable due to continuous interference.

Improving stability of the recording terminal: The recording terminal is a mechanical and electronic apparatus, and is vulnerable to vibration interference, electromagnetic interference, and network collision. The structure of the recording terminal may be designed as vibration-proof and the hardware of the recording terminal may be designed as electromagnetic compatible to minimize the external interference, but the interference cannot be eliminated completely.

Reliable transmission protocol: A reliable transmission protocol is an error recovery solution based on a bidirectional communication mechanism, and is applicable when the live service is provided based on a bidirectional communication network, for example, over the Transmission Control Protocol (TCP) based on an IP network; if a packet is transmitted erroneously, the reliable transmission protocol may require retransmission of the packet. However, due to delay requirements of live broadcast, this mitigation method is limited to be implemented within the time range when the live service is cached on the terminal.

Correcting playing errors on the recording terminal: The correction of playing errors is popular. Its conception is frame skipping, which makes the recorded file be played normally. The correction of playing errors improves the user experience to some extent, but it does not repair the data essentially.

Evidently, the foregoing methods reduce recording errors in the live recording of the media file, but the recording errors are still inevitable. Therefore, it is necessary to repair recording errors that occur in the live recording. In the prior art, the method for repairing the recording errors on the recording terminal is based on a unidirectional network where the media file is broadcast live. That is, the live system head-end can send downlink data to the recording terminal, but the recording terminal cannot send uplink data to the live system head-end. Different from the recording error repair method based on a unidirectional network in the prior art, the embodiments of the present invention support a recording terminal and a network device of the live system; when a recording error occurs during network transmission or the recording process of the recording terminal, the recording terminal sends a recording error repair request that carries description information about the recording error to the network device through a bidirectional communication network between the recording terminal and the network device, and repairs the recorded media file according to the repair information sent by the network device. This ensures reliability of repairing the media file recording error.

Figure 2:
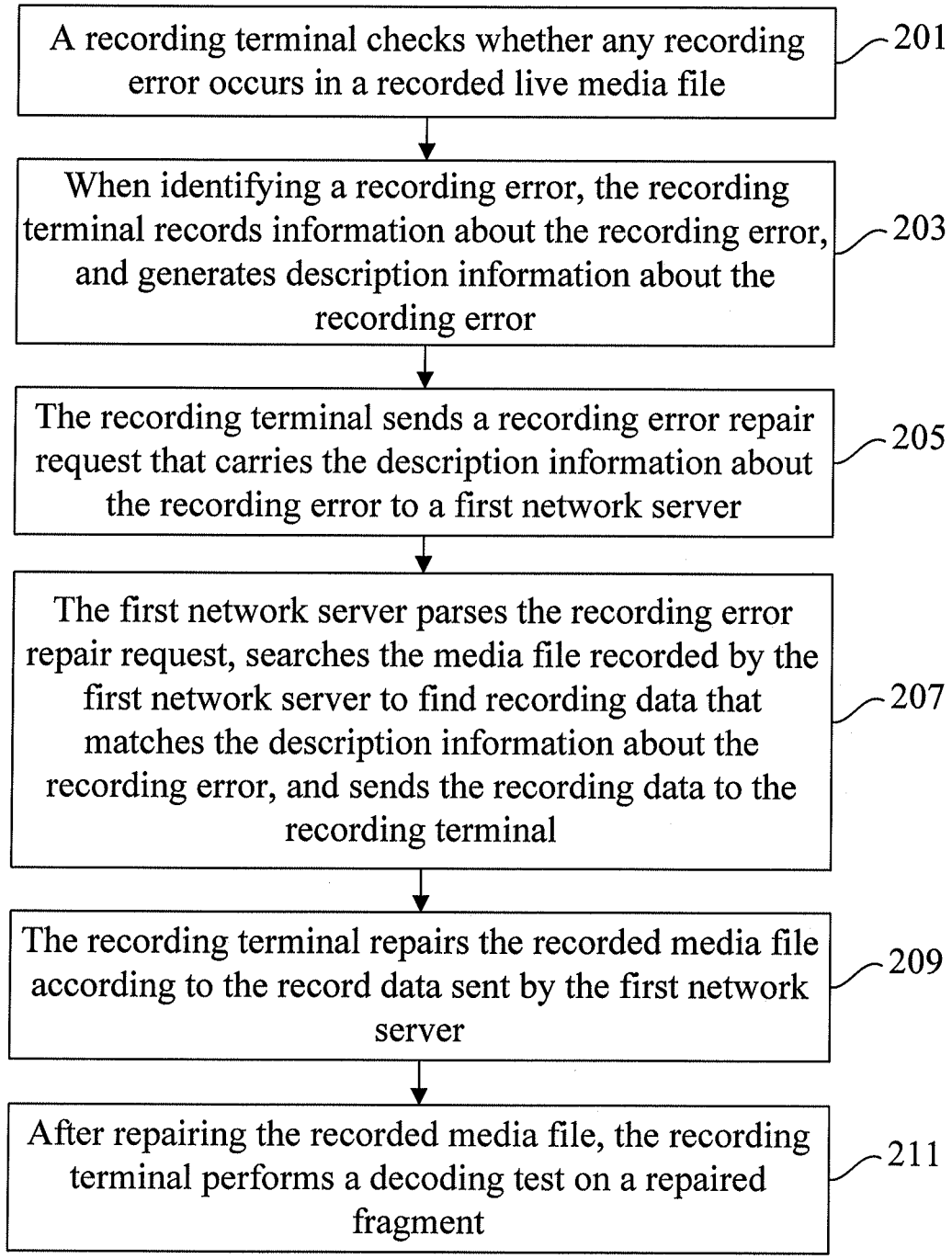
FIG. 2 is a flow chart of a method for repairing media file recording errors according to a second embodiment of the present invention.

FIG. 2 is a flow chart of a method for repairing media file recording errors according to a second embodiment of the present invention. In this embodiment, the bidirectional network where the recording terminal and the network device are located adopts a Client/Server (C/S) architecture. In this embodiment, the network device is a first network server, and both the first network server and the recording terminal support the live recording service on the network. As shown in FIG. 2, the method according to this embodiment includes the following steps:

Step 201: The recording terminal records a media file broadcast live by the live system head-end through a live network, and checks whether any recording error occurs in the recorded media file.

A recording error may be identified in the following ways:

In the live recording of the media file, the recording terminal keeps monitoring the live media file while receiving the media file from the live system head-end through a live network. If any frame is lost or damaged due to packet loss, disorder or packet error in the data receiving process, the recording terminal determines that a recording error occurs.

If the recording terminal cannot identify or record the recording error in real time due to faults of network transmission or faults of the recording terminal in the process of receiving the media file, the recording error may be identified when the recording terminal decodes the recorded media file. When the recording terminal finds that the recorded media file cannot be decoded correctly, the recording terminal determines that a recording error occurs.

A recording error may also be identified manually. If the recording terminal fails to identify the recording error in real time when receiving the media file and finds no exception when decoding the recorded media file, but a partial area of the screen is messed or mosaic in the process of playing the recorded media file, the recording error may be identified manually.

Step 203: When identifying a recording error, the recording terminal records information about the recording error, and generates description information about the recording error.

When identifying a recording error, the recording terminal may generate description information about the recording error according to the type of the recording error. The generated description information includes the type of the recording error. For example, when the media file broadcast by the live system head-end is transmitted on the network in the form of video frames, the recording terminal may record the recording error in the following ways:

When the recording error is loss of a frame (namely, data of a video frame is lost), the recording terminal may set the type value of the recording error to 1. In this case, the recording terminal needs to record information about the lost frame, including identification information and time information of the correct video frame adjacent to the lost video frame. Accordingly, the generated description information about the error type may include: type of the recording error (the type value is 1), and identification information and time information of the correct video frame adjacent to the lost video frame. If the live media file is transmitted in the format of bit streams in the network, the identification information of the correct video frame adjacent to the lost video frame may include the start code prefix of the correct video frame adjacent to the lost video frame. The start code prefix may be a start_code_prefix parameter defined in the Network Abstraction Layer (NAL) in the H.264 video coding standard. If the live media file is transmitted in the format of packets in the network, the identification information about the correct video frame adjacent to the lost video frame may include a transmission protocol index and partial bytes of the video frame; and the time information may include a Decoding Time Stamp (DTS) or calendar time.

When the recording error is damage of a frame (namely, a video frame is partially damaged), the recording terminal may set the type value of the recording error to 2. In this case, the recording terminal needs to record information about the damaged frame, including identification information of the damaged video frame, and identification information and time information of the correct video frame adjacent to the damaged video frame. Accordingly, the generated description information about the error type may include: type of the recording error (the type value is 2), and identification information and time information of the correct video frame adjacent to the damaged video frame.

If the recording error is identified manually, the type value of the recording error may be set to 3. In this case, the recording terminal needs to record the start time point and the end time point within which a partial area of the screen is messed or mosaic, and record the duration. When the recording error is identified manually, because a reaction time is generally needed for manual identification, a preset response period needs to be added before and after the recorded start time point and the end time point. Preferably, the response period is 300 ms.

Step 205: The recording terminal sends a recording error repair request that carries the description information about the recording error to the first network server.

Step 207: The first network server receives and parses the recording error repair request, searches the media file recorded by the first network server to find recording data that matches the description information about the recording error, and sends the recording data as repair information to the recording terminal.

Step 209: The recording terminal repairs the recorded media file according to the recording data sent by the first network server.

When receiving the repair information from the first network server, the recording terminal may initiate repair of the media file recording error in flexible ways. For example, the recording terminal starts a procedure for repairing the recording error automatically when receiving the repair information from the first network server; or starts a procedure for repairing the recording error automatically when preset conditions are fulfilled; or starts a procedure for repairing the recording error as triggered by external factors such as manual start by the user.

In another prior art that repairs recording errors, the recording terminal can correct and repair the recorded content based on a program transmitted after a delay. After the delay, the same program is transmitted on another channel. In the process of implementing the present invention, the inventor finds that in the prior art which transmits the same program on another channel later after the program is broadcast live, the repair of the recording error requires replacement of the entire media file recorded by the recording terminal, and needs to occupy the channel for a long time, which reduces the utilization of the line bandwidth.

Different from the prior art above, the recording terminal according to an embodiment of the present invention repairs the specific data fragment recorded erroneously in the media file in view of the type of the recording error according to recording data sent by the first network server. This reduces the line bandwidth occupied by the repair and improves the utilization of the line bandwidth.

For example, if the recording error is loss of a frame, the recording terminal inserts the repair information from the first network server into a corresponding location of the lost video frame in the media file recorded by the recording terminal.

If the recording error is damage of a frame, the recording terminal uses the repair information from the first network server to replace the corresponding data of the damaged video frame in the media file recorded by the recording terminal.

If the recording error is another type of error, the recording terminal uses the repair information from the first network server to replace the corresponding data that needs repair in the media file recorded by the recording terminal.

Step 211: After repairing the recorded media file, the recording terminal performs a decoding test on the repaired fragment.

To reduce the line bandwidth occupied by the repair of the media file recording error, the recording terminal may start the decoding test on the repaired fragment automatically when the recording terminal is idle. For example, when the user is not using the recording terminal, the recording terminal starts the decoding test on the repaired fragment automatically, and outputs no video in the process of the decoding test.

If the repaired fragment passes the decoding test, the process for repairing the recording error is ended. If the repaired fragment fails to pass the decoding test, the recording terminal generates description information about the recording error again, sends a recording error repair request to the first network server again, and repeats steps 207 to 211 until success of repairing the recording error. Therefore, the decoding test performed on the repaired fragment ensures that the repaired data is normally decodable, and ensures accuracy and reliability of the recording error repair.

In a C/S network architecture in this embodiment, the recording error in the media file recorded by the recording terminal is repaired through a bidirectional communication network between the recording terminal of the live recording service and the first network server, and the reliability of repairing the media file recording error is ensured. The recording error description information generated by the recording terminal includes the details of the recording error, which helps the first network server obtain the matched repair information accurately according to the description information, and improves the accuracy of repairing the recording error. When receiving the repair information from the first network server, the recording terminal repairs the recording error according to the actual requirements flexibly. For example, the recording terminal inserts the correct data into the locations of the specific data fragment recorded erroneously, or replaces the specific data fragment in the media file recorded by the recording terminal instead of replacing the entire media file recorded by the recording terminal. This reduces the line bandwidth occupied by the repair of the recording error, and improves the utilization of the line bandwidth. Further, after the recording error is repaired, the recording terminal tests the repaired fragments, and the repair procedure is not ended until the fragments pass the test successfully, improving reliability and accuracy of repairing the recording error.

Figure 3:
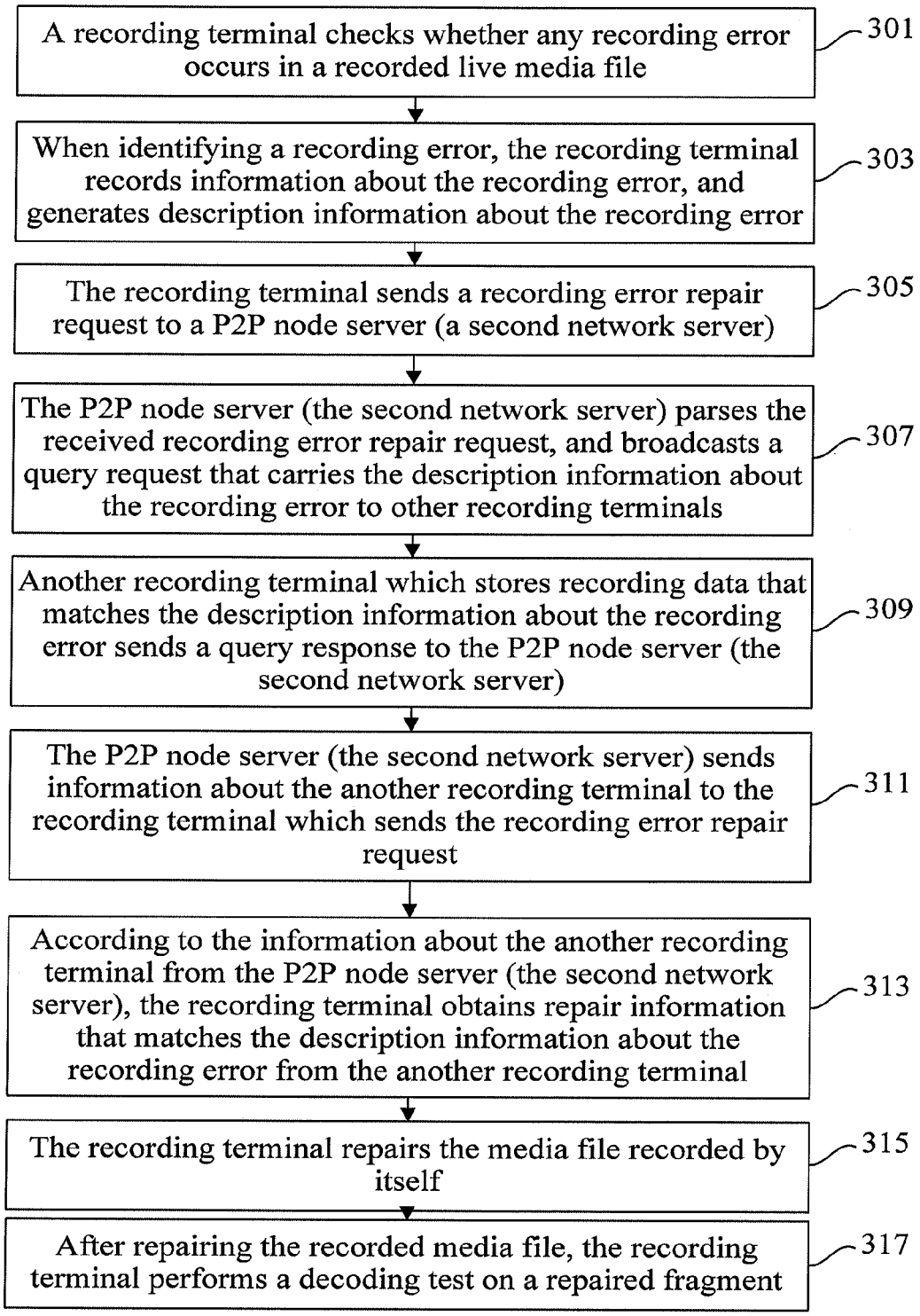
FIG. 3 is a flow chart of a method for repairing media file recording errors according to a third embodiment of the present invention.

FIG. 3 is a flow chart of a method for repairing media file recording errors according to a third embodiment of the present invention. In this embodiment, the network devices include a Point to Point (P2P) node server and other recording terminals which are connected with the P2P node server, where the P2P node server is a second network server, and the recording terminal and other recording terminals are based on a P2P network architecture. As shown in FIG. 3, the method in this embodiment includes the following steps:

Step 301: The recording terminal records a media file broadcast live by the live system head-end through a live network, and checks whether any recording error occurs in the recorded media file.

The methods for identifying a recording error are the same as those described in the embodiment shown in FIG. 2 above.

Step 303: When identifying a recording error, the recording terminal generates description information about the recording error.

When identifying a recording error, the recording terminal may generate the description information about the recording error according to the type of the recording error. The generated description information includes the type of the recording error. For example, when the media file broadcast by the live system head-end is transmitted on the network in the form of data fragments, the recording terminal may record the recording error in the following ways:

When the recording error is loss of an intra-fragment frame (namely, the data fragment is not lost but incomplete, and one or more video frames are lost), the recording terminal sets the type value of the recording error to 4. In this case, the recording terminal needs to record the information about the lost intra-fragment frame, including information about the data fragment where the lost video frame is located, and identification information and time information of the correct video frame adjacent to the lost video frame. Accordingly, the generated description information about the error type may include: type of the recording error (the type value is 4), the information about the data fragment where the lost video frame is located, and the identification information and the time information of the correct video frame adjacent to the lost video frame. If the live media file is transmitted in the format of bit streams in the network, the identification information of the correct video frame adjacent to the lost video frame may include the start code prefix of the correct video frame adjacent to the lost video frame. The start code prefix may be a start_code_prefix parameter defined in the NAL in the H.264 video coding standard. If the live media file is transmitted in the format of packets in the network, the identification information of the correct video frame adjacent to the lost video frame may include a transmission protocol index and partial bytes of the video frame. The time information may include a DTS or calendar time.

When the recording error is loss of a fragment (namely, a data fragment is lost), the recording terminal may set the type value of the recording error to 5. In this case, the recording terminal needs to record the information about the lost fragment, including the information about the correct data fragment adjacent to the lost data fragment. Accordingly, the generated description information about the error type may include: type of the recording error (the type value is 5), and the information about the correct data fragment adjacent to the lost data fragment. When the recording error indicates that certain data fragments are lost and that information in other data fragments is incomplete, the data fragments with incomplete information may be processed as lost data fragments, and the type of the recording error is regarded as damage of a fragment (the type value is 5).

When the recording error is damage of an intra-fragment frame (namely, some video frames in a data fragment are damaged), the recording terminal may set the type value of the recording error to 6. In this case, the recording terminal needs to record the information about the damaged intra-fragment frame, including information about the data fragment where the damaged video frame is located, and identification information and time information of the correct video frame adjacent to the damaged video frame. Accordingly, the generated description information about the error type may include: type of the recording error (the type value is 6), the information about the data fragment where the damaged video frame is located, and the identification information and the time information of the correct video frame adjacent to the damaged video frame.

When the recording error is damage of a fragment (namely, the data of a data fragment is damaged), the recording terminal may set the type value of the recording error to 7. In this case, the recording terminal needs to record the information about the damaged fragment, including information about the damaged data fragment, and identification information and time information of the correct data fragment adjacent to the damaged data fragment. Accordingly, the generated description information about the error type may include: type of the recording error (the type value is 7), the information about the damaged data fragment, and the identification information and the time information of the correct data fragment adjacent to the damaged data fragment.

If the recording error is identified manually, the type of the recording error is set to another value such as 3. In this case, the recording terminal needs to record the start time point and the end time point within which a partial area of the screen is messed or mosaic, and record the duration. When the recording error is identified manually, because a reaction time is generally needed for manual identification, a preset response period needs to be added before and after the recorded start time point and the end time point. Preferably, the response period is 300 ms.

Step 305: The recording terminal sends a recording error repair request that carries the description information about the recording error to a P2P node server (a second network server).

Step 307: The P2P node server (the second network server) parses the received recording error repair request, and broadcasts a query request that carries the description information about the recording error to other recording terminals.

Step 309: Another recording terminal which stores recording data that matches the description information about the recording error sends a query response to the P2P node server (the second network server).

Step 311: The P2P node server (the second network server) sends information about the another recording terminal to the recording terminal which sends the recording error repair request.

Step 313: The recording terminal obtains the recording data that matches the description information about the recording error from the another recording terminal according to the information about the another recording terminal. The recording data is used by the recording terminal as repair information for repairing the recording error.

Step 315: The recording terminal repairs the media file recorded by itself.

When receiving the repair information from another recording terminal, the recording terminal may initiate repair of the media file recording error in flexible ways. For example, the recording terminal starts a procedure for repairing the recording error automatically when receiving the repair information; or starts a procedure for repairing the recording error automatically when preset conditions are fulfilled; or starts a procedure for repairing the recording error as triggered by external factors such as manual start by the user. When the recording terminal initiates repair of the recording error, the recording terminal may use the recording data of another recording terminal to repair the recording error in the recorded media file in view of the type of the recording error.

For example, if the recording error is loss of an intra-fragment frame or loss of a fragment, the recording terminal inserts the repair information from another recording terminal into the corresponding location of the lost video frame in the media file recorded by the recording terminal, or the corresponding location of the lost data fragment.

If the recording error is damage of an intra-fragment frame or damage of a fragment, the recording terminal uses the repair information from another recording terminal to replace the corresponding data of the damaged video frame in the media file recorded by the recording terminal, or the corresponding data of the damaged data fragment.

If the recording error is another type of error, the recording terminal uses the repair information from the first network server to replace the corresponding data that needs repair in the media file recorded by the recording terminal.

Step 317: After repairing the recorded media file, the recording terminal performs a decoding test on the repaired fragment.

To reduce the line bandwidth occupied by the repair of the media file recording error, the recording terminal may start the decoding test on the repaired fragment automatically when the recording terminal is idle. For example, when the user is not using the recording terminal, the recording terminal starts the decoding test on the repaired fragment automatically, and outputs no video in the process of the decoding test.

If the repaired fragment passes the decoding test, the procedure for repairing the recording error is ended. If the repaired fragment fails to pass the decoding test, the recording terminal generates description information about the recording error again, sends a recording error repair request to the second network server again, and repeats steps 307 to 317 until success of repairing the recording error. Therefore, the decoding test performed on the repaired fragment ensures that the repaired data is normally decodable, and ensures accuracy and reliability of the recording error repair.

In the embodiment above, while the recording terminal records the media file live through a live network, the recording terminal can repair the recording error in the media file based on the P2P communication technology, where the media file is recorded by the recording terminal, and the repair is performed through a bidirectional communication network between the recording terminal of the live recording service and another recording terminal. In this way, the reliability of repairing the media file recording error is ensured. The recording error description information generated by the recording terminal includes the details of the recording error, which helps other recording terminals obtain the matched repair information accurately according to the description information, and improves the accuracy of repairing the recording error. When receiving the repair information from another recording terminal, the recording terminal can repair the recording error according to actual requirements flexibly, reducing the line bandwidth occupied by the repair of the recording error. Further, after the recording error is repaired, the recording terminal tests the repaired fragments, and the repair procedure is not ended until the fragments pass the test successfully, improving reliability and accuracy of repairing the recording error.

Figure 4:
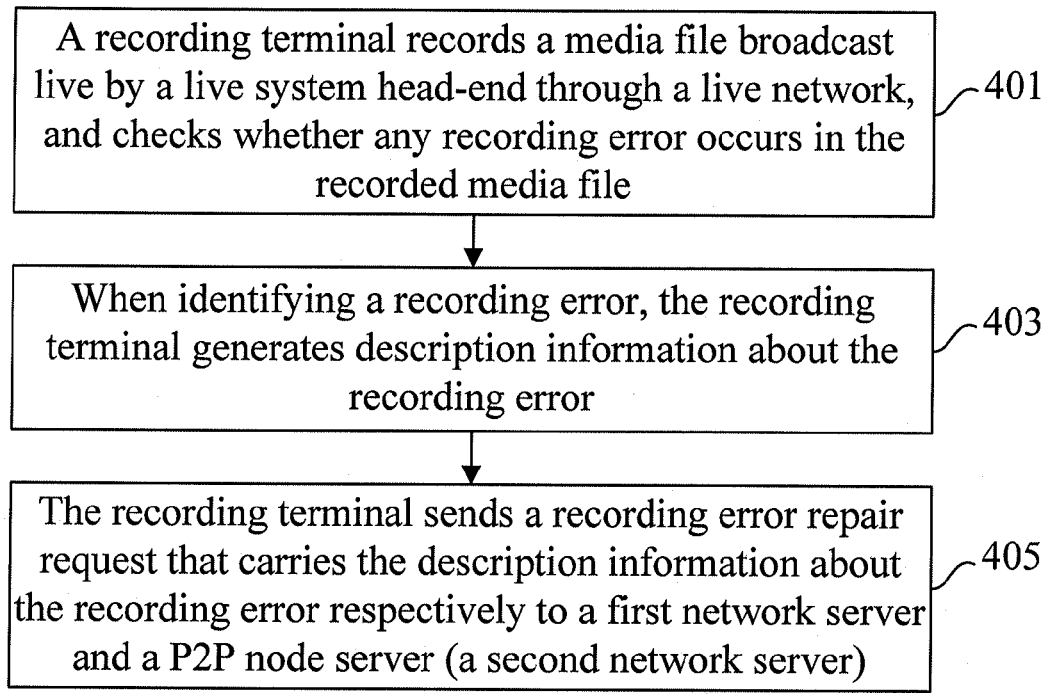
FIG. 4 is a flow chart of a method for repairing media file recording errors according to a fourth embodiment of the present invention.

FIG. 4 is a flow chart of a method for repairing media file recording errors according to a fourth embodiment of the present invention. When a recording error occurs in a media file recorded by a recording terminal, the recording error may be repaired through multiple heterogeneous networks. In this embodiment, the architecture of the bidirectional network connected to the recording terminal may be a C/S network architecture or a P2P network architecture. The server that supports the live recording service in the C/S network architecture is a first network server; and the P2P node server in the P2P network is a second network server in this embodiment. The P2P network may include many other recording terminals. As shown in FIG. 4, the method in this embodiment includes the following steps:

Step 401: The recording terminal records a media file broadcast live by the live system head-end through a live network, and checks whether any recording error occurs in the recorded media file.

Step 403: When identifying a recording error, the recording terminal generates description information about the recording error.

Step 405: The recording terminal sends a recording error repair request that carries the description information about the recording error to a first network server and a P2P node server (a second network server).

The recording terminal may send the recording error repair request to the first network server and the P2P node server (the second network server) one by one or simultaneously.

In the case that the recording error repair request is sent to the two network servers one by one, if the recording terminal sends a recording error repair request to either network server first and receives a correct response from this network server, the recording terminal may give up sending the recording error repair request to the other network server; if the recording terminal does not receive a correct response from this network server, the recording terminal sends the recording error repair request to the other network server.

In the case that the recording error repair request is sent to the first network server and the second network server simultaneously, when the recording terminal receives a correct response from either of the network servers, the recording terminal may send a recording error repair cancelation request to the other network server.

In this embodiment, the recording error is repaired through a heterogeneous bidirectional network associated with the recording terminal. When the recording terminal fails to obtain the repair information in the interactive communication with one network server, the recording terminal can obtain the record information required for repairing the recording error through the other network server, improving reliability of repairing the recording error.

Figure 5:
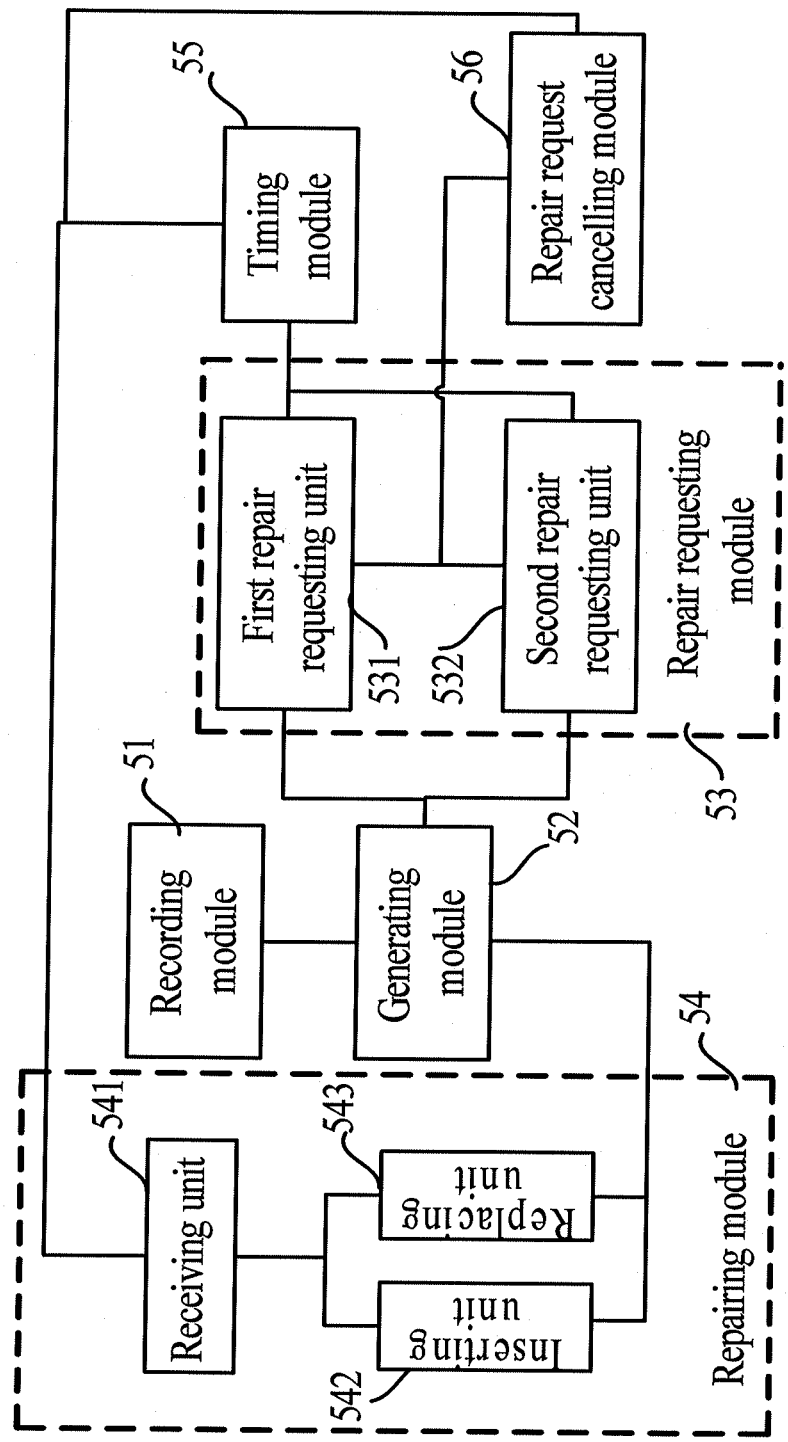
FIG. 5 shows a structure schematic diagram of a recording terminal according to an embodiment of the present invention.

FIG. 5 shows a structure schematic diagram of a recording terminal according to an embodiment of the present invention. As shown in FIG. 5, the recording terminal in this embodiment includes:

a recording module 51, configured to record a media file through a live network, where the media file is played by a live system head-end;

a generating module 52, configured to generate description information about a recording error when identifying the recording error in live recording of the media file;

a repair requesting module 53, configured to send a recording error repair request to a network device, where the recording error repair request carries the description information generated by the generating module 52; and a repairing module 54, configured to repair the media file recorded by the recording module 51 according to repair information when receiving the repair information sent by the network device according to the description information.

On the basis of the foregoing technical solution, when the description information about the recording error includes the type of the recording error, the repairing module 54 may further include:

a receiving unit 541, configured to receive the repair information sent by the network device according to the description information about the recording error;

an inserting unit 542, configured to insert repair information into a corresponding location of a lost video frame in the media file recorded by the recording terminal if the recording error is loss of a frame, or into a corresponding location of a lost data fragment if the recording error is loss of a fragment; and a replacing unit 543, configured to use the repair information to replace the corresponding data in a damaged video frame in the media file recorded by the recording terminal if the recording error is damage of a frame, or replace the corresponding data in a damaged data fragment if the recording error is damage of a fragment.

On the basis of the foregoing technical solution, when the network devices include the first network server and the second network server, the repair requesting module 53 may further include a first repair requesting unit 531 and a second repair requesting unit 532.

The first repair requesting unit 531 is configured to send a recording error repair request to the first network server.

The second repair requesting unit 532 is configured to send a recording error repair request to the second network server.

The repair requesting module 53 may send the recording error repair request to the first network server and the second network server one by one or send the recording error repair request to the first network server and the second network server simultaneously.

If the repair requesting module 53 sends the recording error repair request to the first network server and the second network server one by one, the recording terminal may further include a timing module 55.

The timing module 55 is configured to: activate the first repair requesting unit 531 to send the recording error repair request to the first network server and start a timer, and activate the second repair requesting unit 532 to send the recording error repair request to the second network server if the repairing module 54 receives no correct response from the first network server within a preset time.

Alternatively, the timing module 55 is configured to: activate the second repair requesting unit 532 to send the recording error repair request to the second network server and start a timer, and activate the first repair requesting module 531 to send the recording error repair request to the first network server if the repairing module 54 receives no correct response from the second network server within a preset time.

If the repair requesting module 53 sends the recording error repair request to the first network server and the second network server simultaneously, the recording terminal may further include a repair request cancelling module 56.

Figure 6:
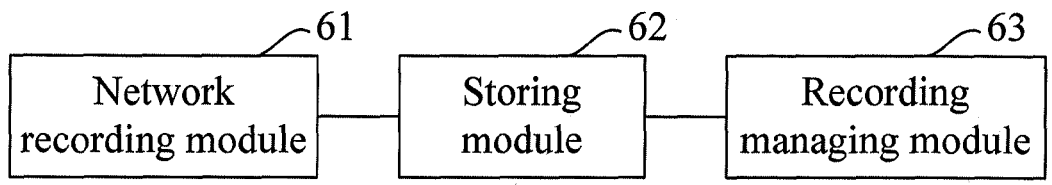
FIG. 6 shows a structure schematic diagram of a network server according to an embodiment of the present invention.

The repair request cancelling module 56 is configured to send a recording error repair cancellation request to the second network server when the repairing module 54 receives a response from the first network server; or send a recording error repair cancellation request to the first network server when the repairing module 54 receives a response from the second network server. In the embodiment above, the repair requesting module sends a recording error repair request that carries the description information about the recording error to the network device through a bidirectional network between the recording terminal and the network device, and the repairing module repairs the recorded media file according to the repair information sent by the network device, ensuring reliability of repairing the media file recording error. Meanwhile, in this embodiment, because the recording error is repaired based on a bidirectional channel of the bidirectional network, the line bandwidth occupied by the repair of the recording error is reduced, and the utilization of the line bandwidth is improved. FIG. 6 shows a structure schematic view of a network server according to an embodiment of the present invention. As shown in FIG. 6, the network server in this embodiment includes:

a network recording module 61, configured to record a media file live;

a storing module 62, configured to store data recorded by the recording module; and a recording managing module 63, configured to: receive a recording error repair request that carries description information about a recording error identified by a recording terminal in live recording of the media file; and obtain recording data that matches the description information from the storing module, and send the recording data to the recording terminal.

In the embodiment above, the network server receives a recording error repair request from the recording terminal through a bidirectional network between the recording terminal and the network server, and sends recording data that matches the request to the recording terminal. In this way, the recording terminal can repair the recorded media file, and the reliability of repairing the media file recording error is ensured. Further, the repairing module in this embodiment can repair the media file recorded by the recording terminal by inserting correct data into a location of the specific data fragment recorded erroneously or replacing the erroneous data fragment according to the received repair information, reducing the line bandwidth occupied by the repair of the recording error, and improving the utilization of the line bandwidth.

Figure 7:
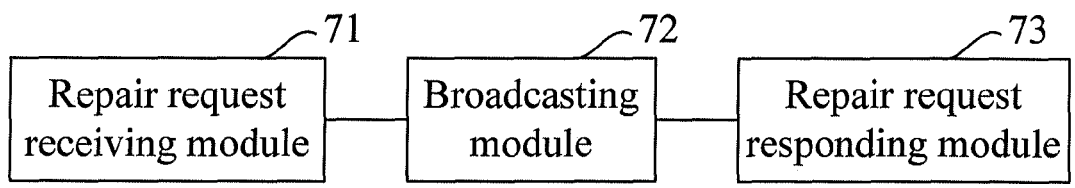
FIG. 7 shows a structure schematic diagram of another network server according to an embodiment of the present invention.

FIG. 7 shows a structure schematic diagram of another network server according to an embodiment of the present invention. As shown in FIG. 7, the network server in this embodiment includes:

a repair request receiving module 71, configured to receive a recording error repair request that carries description information about a recording error identified by a recording terminal in live recording of a media file;

a broadcasting module 72, configured to broadcast a query request that carries the description information; and a repair request responding module 73, configured to send information about another recording terminal which stores recording data that matches the description information to the recording terminal when receiving a query response sent by the another recording terminal.

In the embodiment above, the network server receives a recording error repair request from the recording terminal through a bidirectional network between the recording terminal and the network server, and sends the information about the another recording terminal that stores the recording data that matches the request to the recording terminal. In this way, the recording terminal that sends the recording error repair request can obtain correct recording data from the another recording terminal to repair the recorded media file, ensuring reliability of repairing the media file recording error.

Figure 8:
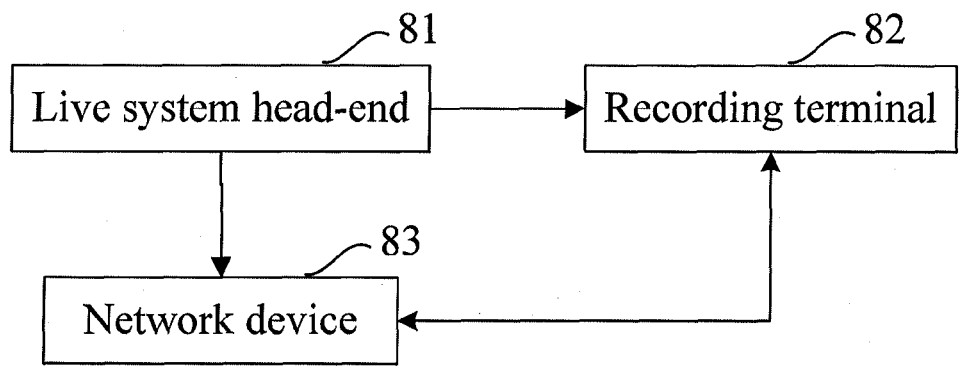
FIG. 8 shows a structure schematic diagram of a system for repairing media file recording errors according to a first embodiment of the present invention.

FIG. 8 shows a structure schematic view of a system for repairing media file recording errors according to a first embodiment of the present invention. As shown in FIG. 8, the system for repairing media file recording errors includes: a live system head-end 81, a recording terminal 82, and a network device 83. The live system head-end 81 is connected with the recording terminal 82 and the network device 83 through the unidirectional communication network (such as a live network). The recording terminal 82 is connected with the network device 83 through a bidirectional communication network.

The live system head-end 81 is configured to broadcast a media file live through a unidirectional communication network.

The recording terminal 82 is configured to: generate description information about a recording error when identifying the recording error in live recording of the media file of the live system head-end 81; send a recording error repair request that carries the description information to the network device 83; and repair the media file recorded by the recording terminal according to repair information when receiving the repair information sent by the network device 83 according to the description information.

The network device 83 is configured to send the repair information that matches the description information about the recording error to the recording terminal 82 when receiving the recording error repair request sent by the recording terminal 82.

In the system provided in the foregoing embodiment, when the recording terminal records the media file of the live system head-end erroneously, the system sends a recording error repair request that carries description information about the recording error to the network device through a bidirectional network between the recording terminal and the network device, and repairs the recorded media file according to the repair information sent by the network device, ensuring reliability of repairing the media file recording error.

Figure 9:
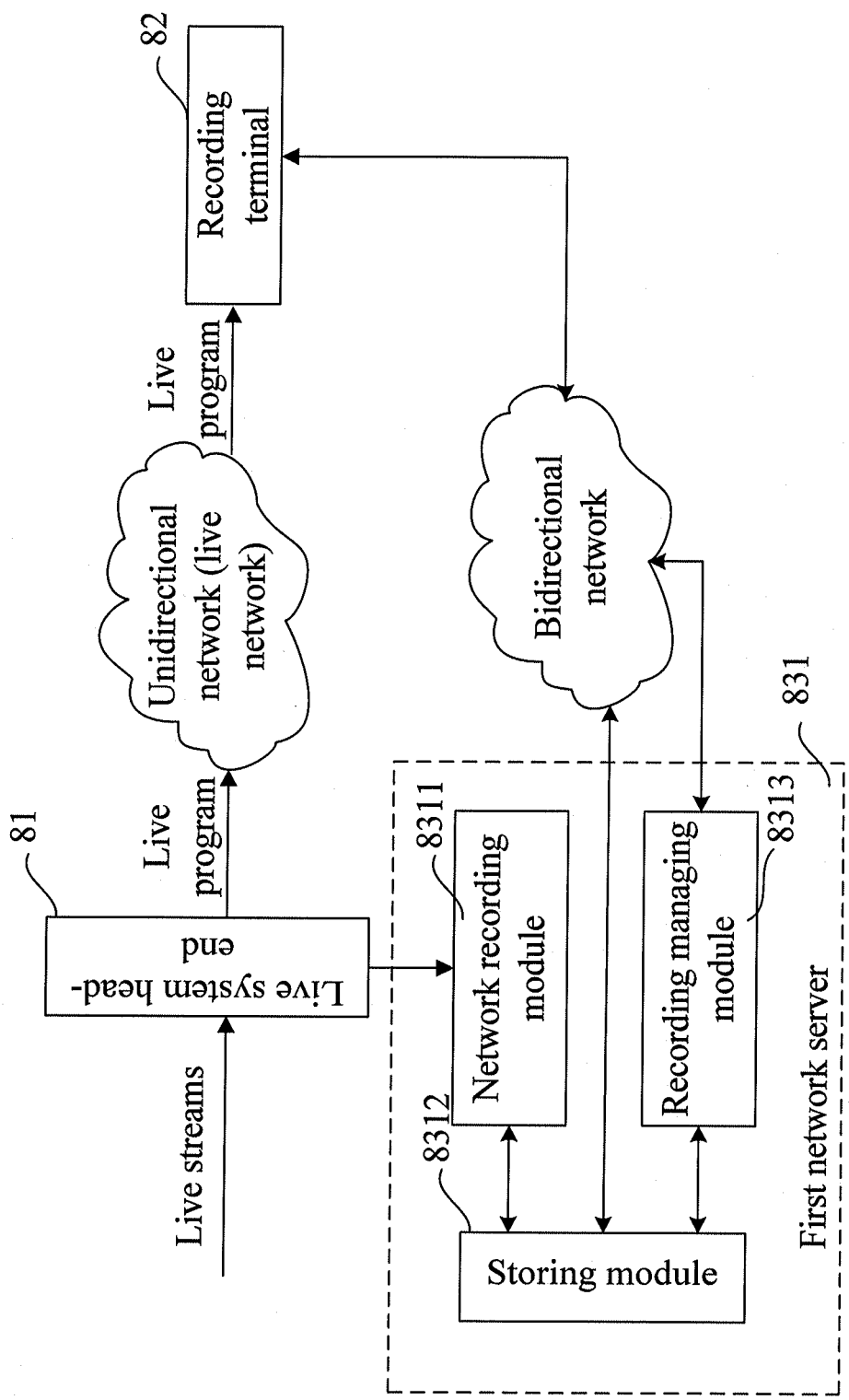
FIG. 9 shows a structure schematic diagram of a system for repairing media file recording errors according to a second embodiment of the present invention.

FIG. 9 shows a structure schematic diagram of a system for repairing media file recording errors according to a second embodiment of the present invention. As shown in FIG. 9, this embodiment differs from the embodiment shown in FIG. 8 in that: In this embodiment, the network devices include a first network server 831; the repair information sent by the network device to the recording terminal includes the recording data that is recorded by the first network server 831 and matches the description information about the recording error. The first network server 831 includes:

a network recording module 8311, configured to record the media file of a live system head-end 81 live;

a storing module 8312, configured to store data recorded by the network recording module 8311; and a recording managing module 8313, configured to: receive a recording error repair request sent by the recording terminal 82, where the recording error repair request carries description information about the recording error identified by the recording terminal 82 in live recording of the media file, obtain recording data that matches the description information from the storing module 8312, and send the recording data to the recording terminal 82.

In the embodiment above, when the recording terminal identifies a recording error, the recording terminal obtains repair information from the first network server through a bidirectional communication network (C/S network architecture) between the recording terminal of the live recording service and the first network server, and repairs the recording error in the media file recorded by the recording terminal, ensuring reliability of repairing the media file recording error.

Figure 10:
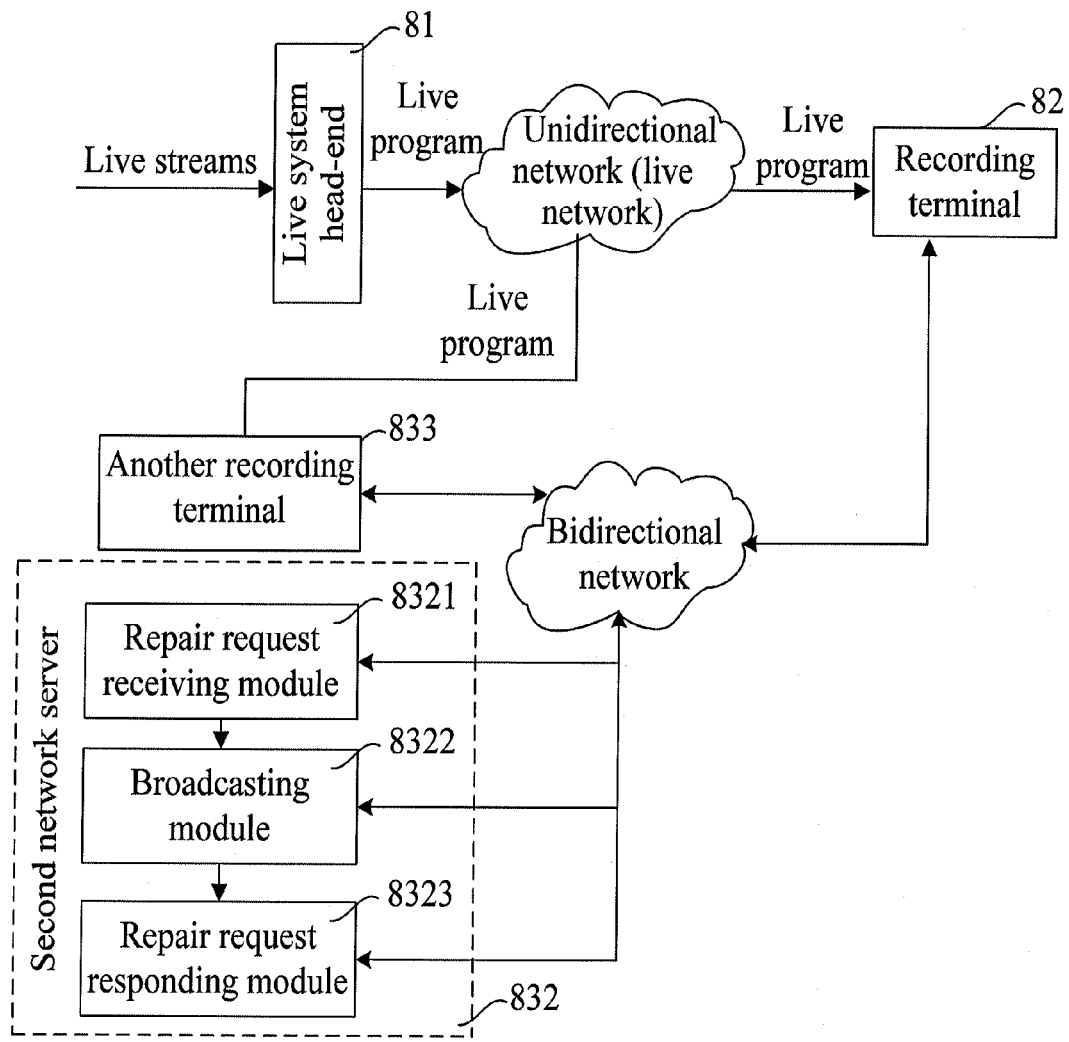
FIG. 10 shows a structure schematic diagram of a system for repairing media file recording errors according to a third embodiment of the present invention.

FIG. 10 shows a structure schematic diagram of a system for repairing media file recording errors according to a third embodiment of the present invention. As shown in FIG. 10, this embodiment differs from the embodiment shown in FIG. 8 in that: In this embodiment, the network devices include a second network server 832 and another recording terminal 833; the repair information sent by the network device to the recording terminal includes the recording data that is recorded by the another recording terminal 833 and matches the description information. The second network server 832 includes:

a repair request receiving module 8321, configured to receive a recording error repair request that carries description information about a recording error identified by a recording terminal 82 in live recording of a media file;

a broadcasting module 8322, configured to broadcast a query request that carries the description information; and a repair request responding module 8323, configured to send information about another recording terminal 833 which stores recording data that matches the description information to the recording terminal 82 when receiving a query response sent by the another recording terminal 833 to the second network server 832.

The another recording terminal 833 is configured to determine whether itself stores the recording data that matches the description information according to the description information carried in the query request when receiving the query request from the second network server 832, and if itself stores the recording data that matches the description information, send a query response to the second network server 832.

In the embodiment above, when the recording terminal identifies a recording error, the recording terminal sends a recording error repair request to the second network server through a bidirectional communication network (P2P network architecture) between the recording terminal of the live recording service, the second network server and the another recording terminal, and obtains repair information from the another recording terminal according to information about the another recording terminal that stores the recording data that matches the description information about the recording error when receiving the information about the another recording terminal from the second network server. In this way, the recording error in the media file recorded by the recording terminal is repaired, and the reliability of repairing the recording error is ensured.

Figure 11:
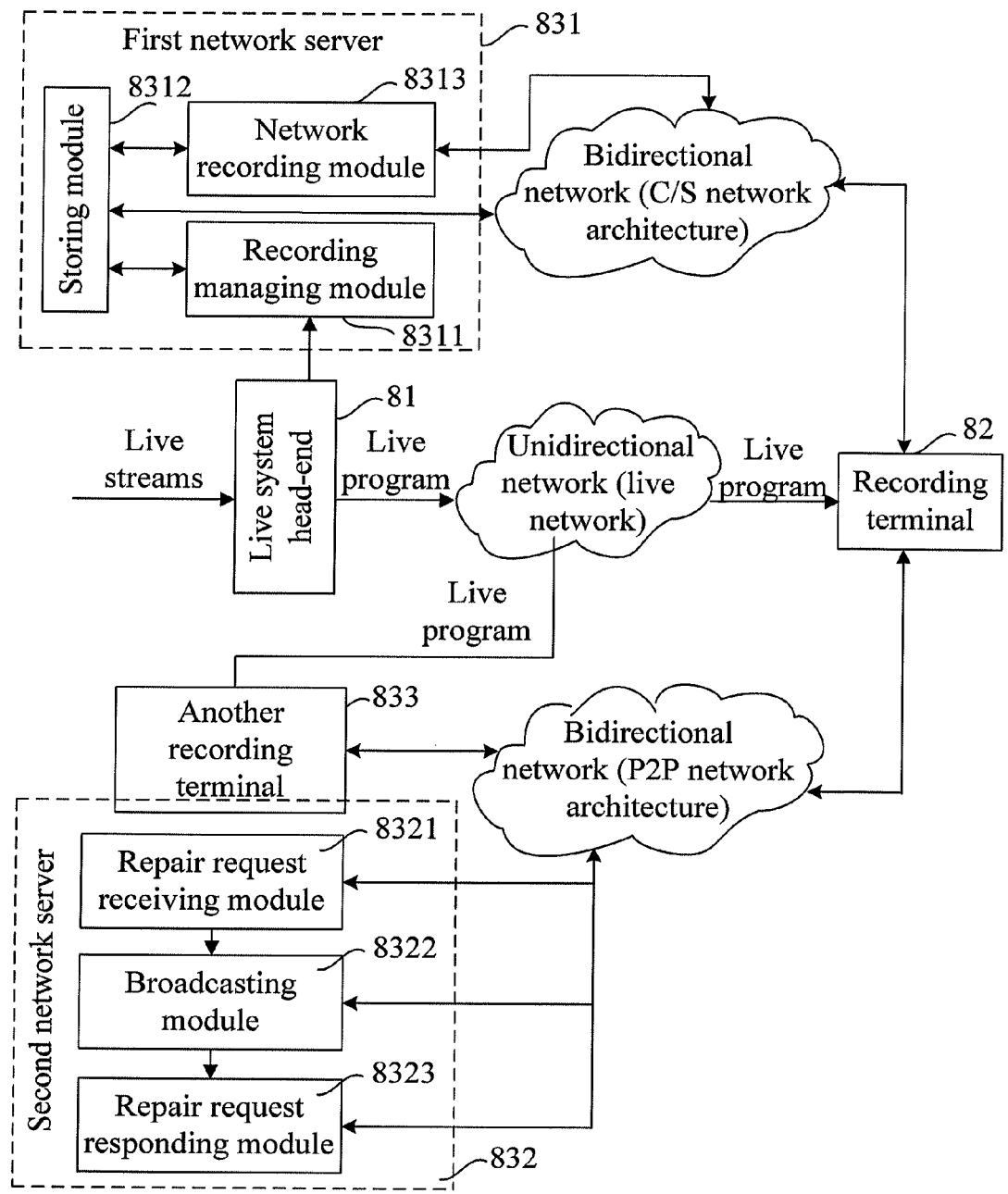
FIG. 11 shows a structure schematic diagram of a system for repairing media file recording errors according to a fourth embodiment of the present invention.

FIG. 11 shows a structure schematic diagram of a system for repairing media file recording errors according to a fourth embodiment of the present invention. As shown in FIG. 11, this embodiment differs from the embodiment shown in FIG. 8 in that: In this embodiment, the recording error of the recording terminal is repaired based on a heterogeneous bidirectional network. In this embodiment, the network devices may include a first network server 831 in a first bidirectional network architecture (such as a C/S network architecture), and a second network server 832 and another recording terminal 833 in a second bidirectional network architecture (such as a P2P network architecture).

The recording terminal 82 is further configured to send a recording error repair request to the first network server 831 and the second network server 832.

The recording terminal 82 may send the recording error repair request to the first network server 831 and the second network server 832 one by one or simultaneously.

In the case that the recording error repair request is sent to the first network server 831 and the second network server 832 on e by one, if the recording terminal 82 sends the recording error repair request to either network server first and receives a correct response from this network server, the recording terminal may give up sending the recording error repair request to the other network server; if the recording terminal 82 does not receive a correct response from this network server, the recording terminal sends the recording error repair request to the other network server.

In the case that the recording error repair request is sent to the first network server 831 and the second network server 832 simultaneously, when the recording terminal 82 receives a correct response from either of the network servers, the recording terminal 82 may send a recording error repair cancelation request to the other network server.

The detailed functional modules of the first network server 831 are illustrated in FIG. 9, and the method for repairing the recording error based on the first bidirectional communication network between the recording terminal 82 and the first network server 831 is described in the embodiment shown in FIG. 2, and therefore is not described herein again; the detailed functional modules of the second network server 832 are illustrated in FIG. 10, and the method for repairing the recording error based on the second bidirectional communication network between the recording terminal 82, the second network server 832 and another network server 833 is described in the embodiment shown in FIG. 3, and therefore is not described herein again.

In this embodiment, the recording error is repaired through the heterogeneous bidirectional network associated with the recording terminal. When the recording terminal fails to obtain the repair information in the interactive communication with one network server, the recording terminal can obtain the record information required for repairing the recording error through the other network server, improving reliability of repairing the recording error.

It is understandable to those skilled in the art that the accompanying drawings are only schematic diagrams of the preferred embodiments, and the modules or processes in the accompanying drawings are not mandatory for implementing the present invention.

It is understandable to those skilled in the art that modules in an apparatus according to an embodiment of the present invention may be distributed in the apparatus described herein, or may be located in one or more apparatuses different from the apparatus described herein. The modules may be combined into one module, or split into multiple submodules.

The sequence numbers of the embodiments above are intended to facilitate description only, and do not represent the priority of each embodiment.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read Only Memory (ROM), a Random Access Memory (RAM), a magnetic disk, or a compact disk.

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A method for repairing media file recording errors, comprising:
    generating description information about a recording error when a recording terminal identifies the recording error in live recording of a media file, wherein the live media file is transmitted in data fragments on a network, and the description information comprises one or more types of the recording error identified by the recording terminal, the one or more types of the recording error comprise: a loss of an intra-fragment frame, a loss of a fragment, damage of an intra-fragment frame, and damage of a fragment;
    sending a recording error repair request that carries the description information to a network device via the network; and
    repairing the media file recorded by the recording terminal according to repair information when receiving the repair information sent via the network by the network device according to the description information,
    wherein:
    if the type of the recording error is loss of an intra-fragment frame, the description information further comprises information about a data fragment where a lost video frame is located, and identification information and time information of a correct video frame adjacent to the lost video frame;
    if the type of the recording error is loss of a fragment, the description information further comprises information about a correct data fragment adjacent to a lost data fragment;
    if the type of the recording error is damage of an intra-fragment frame, the description information further comprises information about a data fragment where a damaged video frame is located, and identification information and time information of a correct video frame adjacent to the damaged video frame; and
    if the type of the recording error is damage of a fragment, the description information further comprises information about a damaged data fragment, and identification information and time information of a correct data fragment adjacent to the damaged data fragment.

2. The method for repairing media file recording errors according to claim 1, wherein:
    the network device comprises a first network server; and the repair information comprises recording data that is recorded by the first network server and matches the description information.

3. The method for repairing media file recording errors according to claim 1, wherein:
    the network device comprises a second network server and another recording terminal; and
    the repair information comprises recording data that is recorded by the another recording terminal and matches the description information;
    the sending of the recording error repair request to the network device comprises: sending the recording error repair request to the second network server; and
    the repairing of the media file recorded by the recording terminal according to the repair information when receiving the repair information sent by the network device according to the description information comprises: obtaining the recording data that matches the description information from the another recording terminal when receiving information about the another recording terminal that stores the recording data which matches the description information, wherein the information about the another recording terminal is delivered by the second network server according to the description information; and repairing the media file recorded by the recording terminal according to the recording data.

4. The method for repairing media file recording errors according to claim 3, wherein:
    when the second network server receives the description information, the method further comprises:
    receiving, by the recording terminal, the information about the another recording terminal from the second network server;

the information about the another recording terminal is information about the another recording terminal which sends a query response to the second network server and stores the recording data that matches the description information; and the query response corresponds to a the query request broadcast by the second network server to other recording terminals, and carries the description information.

5. The method for repairing media file recording errors according to claim 1, wherein:

the network device comprises a first network server and a second network server;

the sending of the recording error repair request to the network device comprises:

sending the recording error repair request to the first network server, and sending the recording error repair request to the second network server if no correct response is received from the first network server within a preset time; or sending the recording error repair request to the second network server, and sending the recording error repair request to the first network server if no correct response is received from the second network server within a preset time.

6. The method for repairing media file recording errors according to claim 1, wherein:

the network device comprises a first network server and a second network server; and the sending of the recording error repair request to the network device comprises: sending the recording error repair request to the first network server and the second network server.

7. The method for repairing media file recording errors according to claim 6, wherein:

after sending the recording error repair request to the first network server and the second network server, the method further comprises:

sending a recording error repair cancellation request to the second network server when receiving a response from the first network server; or sending a recording error repair cancellation request to the first network server when receiving a response from the second network server.

8. The method for repairing media file recording errors according to claim 1, wherein:

the description information comprises a type of the recording error; when the live media file is transmitted in video frames on a network, the type of the recording error identified by the recording terminal may be loss of a frame or damage of a frame;

if the type of the recording error is loss of a frame, the description information further comprises identification information and time information of a correct video frame adjacent to a lost video frame; and if the type of the recording error is damage of a frame, the description information further comprises identification information of a damaged video frame, and identification information and time information of a correct video frame adjacent to the damaged video frame.

9. The method for repairing media file recording errors according to claim 8, wherein:

the repairing of the media file recorded by the recording terminal according to the repair information comprises:

repairing the media file recorded by the recording terminal according to the repair information and the type of the recording error.

10. The method for repairing media file recording errors according to claim 1, wherein:

the repairing of the media file recorded by the recording terminal according to the repair information comprises:

repairing the media file recorded by the recording terminal according to the repair information and the type of the recording error.

11. The method for repairing media file recording errors according to claim 9, wherein:

the repairing of the media file recorded by the recording terminal according to the repair information and the type of the recording error comprises:

inserting the repair information into a corresponding location of the lost video frame in the media file recorded by the recording terminal if the recording error is loss of a frame or loss of an intra-fragment frame, or into a corresponding location of the lost data fragment if the recording error is loss of a fragment; and using the repair information to replace corresponding data in the damaged video frame in the media file recorded by the recording terminal if the recording error is damage of a frame or damage of an intra-fragment frame, or to replace corresponding data in the damaged data fragment if the recording error is damage of a fragment.

12. The method for repairing media file recording errors according to claim 10, wherein:

the repairing of the media file recorded by the recording terminal according to the repair information and the type of the recording error comprises:

inserting the repair information into a corresponding location of the lost video frame in the media file recorded by the recording terminal if the recording error is loss of a frame or loss of an intra-fragment frame, or into a corresponding location of the lost data fragment if the recording error is loss of a fragment; and using the repair information to replace corresponding data in the damaged video frame in the media file recorded by the recording terminal if the recording error is damage of a frame or damage of an intra-fragment frame, or to replace corresponding data in the damaged data fragment if the recording error is damage of a fragment.

13. A recording terminal, comprising a recorder and further comprising:

a processor, configured to generate description information about a recording error when identifying the recording error in live recording of a media file, wherein the live media file is transmitted in data fragments on a network, and the description information comprises one or more types of the recording error identified by the recording terminal the one or more types of the recording error comprise: a loss of an intra-fragment frame, a loss of a fragment, damage of an intra-fragment frame, and damage of a fragment;

a transmitter, configured to send a recording error repair request that carries the description information via a network to a network device; and a receiver, configured to receive repair information sent via the network by the network device according to the description information, wherein the processor is configured to repair the media file recorded by the recording terminal according to the repair information when the receiver has received the repair information, and to activate the first transmitter and start a timer, and activate the second transmitter if the receiver receives no correct response from the first network server within a preset time; or activate the second transmitter and start a timer, and activate the first transmitter if the receiver receives no correct response from the second network server within a preset time.

14. The recording terminal according to claim 13, wherein if the network device comprises a first network server and a second network server, the transmitter comprises:
a first transmitter, configured to send the recording error repair request to the first network server; and
a second transmitter, configured to send the recording error repair request to the second network server.

15. The recording terminal according to claim 14, wherein:
the transmitter is further configured to send a recording error repair cancellation request to the second network server when the receiver has received a response from the first network server; or send a recording error repair cancellation request to the first network server when the receiver has received a response from the second network server.

16. The recording terminal according to claim 13, wherein the receiver is configured to receive the repair information sent by the network device according to the description information;
the processor is configured to insert the repair information into a corresponding location of a lost video frame in the media file recorded by the recording terminal if the recording error is loss of a frame, or into a corresponding location of a lost data fragment if the recording error is loss of a fragment; and
the processor is configured to use the repair information to replace corresponding data in a damaged video frame in the media file recorded by the recording terminal if the recording error is damage of a frame, or replace corresponding data in a damaged data fragment if the recording error is damage of a fragment.

17. A network server, comprising:
a receiver, configured to receive a recording error repair request that carries description information about a recording error identified by a recording terminal in live recording of a media file, wherein the live media file is transmitted in data fragments on a network, and the description information comprises one or more types of the recording error identified by the recording terminal, the one or more type of the recording error comprise: a loss of an intra-fragment frame, a loss of a fragment, damage of an intra-fragment frame, and damage of a fragment;
a broadcaster, configured to broadcast a query request that carries the description information; and
a transmitter, configured to send information about another recording terminal which stores recording data that matches the description information to the recording terminal when receiving a query response sent by the another recording terminal.

18. A system for repairing media file recording errors, comprising a live system head-end, a network device, and a recording terminal, wherein:
the recording terminal is configured to: generate description information about a recording error when identifying the recording error in live recording of a media file of the live system head-end, wherein the live media file is transmitted in data fragments on a network, and the description information comprises one or more types of the recording error identified by the recording terminal, the one or more types of the recording error comprise: a loss of an intra-fragment frame, a loss of a fragment, damage of an intra-fragment frame, and damage of a fragment; send a recording error repair request that carries the description information via the network to the network device; and repair the media file recorded by the recording terminal according to repair information when receiving the repair information sent via the network by the network device according to the description information; and
the network device is configured to send via the network the repair information that matches the description information to the recording terminal when receiving the recording error repair request,
wherein:
the network device comprises a second network server and another recording terminal;
the repair information comprises recording data that is recorded by the another recording terminal and matches the description information;
the second network server comprises:
a repair request receiving module, configured to receive the recording error repair request that carries the description information about the recording error identified by the recording terminal in live recording of the media file;
a broadcasting module, configured to broadcast a query request that carries the description information; and
a repair request responding module, configured to send information about the another recording terminal which stores recording data that matches the description information to the recording terminal when receiving a query response sent by the another recording terminal to the second network server.

19. The system for repairing media file recording errors according to claim 18, wherein:
the network device comprises a first network server; and the repair information comprises recording data that is recorded by the first network server and matches the description information; and the first network server comprises:
a network recording module, configured to record the media file of the live system head-end live;
a storing module, configured to store data recorded by the network recording module; and
a recording managing module, configured to: receive the recording error repair request that carries the description information about the recording error identified by the recording terminal in live recording of the media file; and obtain recording data that matches the description information from the storing module, and send the recording data to the recording terminal.

20. The system for repairing media file recording errors according to claim 18, wherein:
the network device comprises a first network server and a second network server; and
the recording terminal is further configured to send the recording error repair request to the first network server, and send the recording error repair request to the second network server if no response is received from the first network server within a preset time; or configured to send the recording error repair request to the second network server, and send the recording error repair request to the first network server if no response is received from the second network server within a preset time.

21. The system for repairing media file recording errors according to claim 18, wherein:
the network device comprises a first network server and a second network server; and
the recording terminal is further configured to: send the recording error repair request to the first network server and the second network server; and send a recording error repair cancellation request to the second network server when receiving a response from the first network server, or send a recording error repair cancellation request to the first network server when receiving a response from the second network server.

* * * * *